Figure 1:
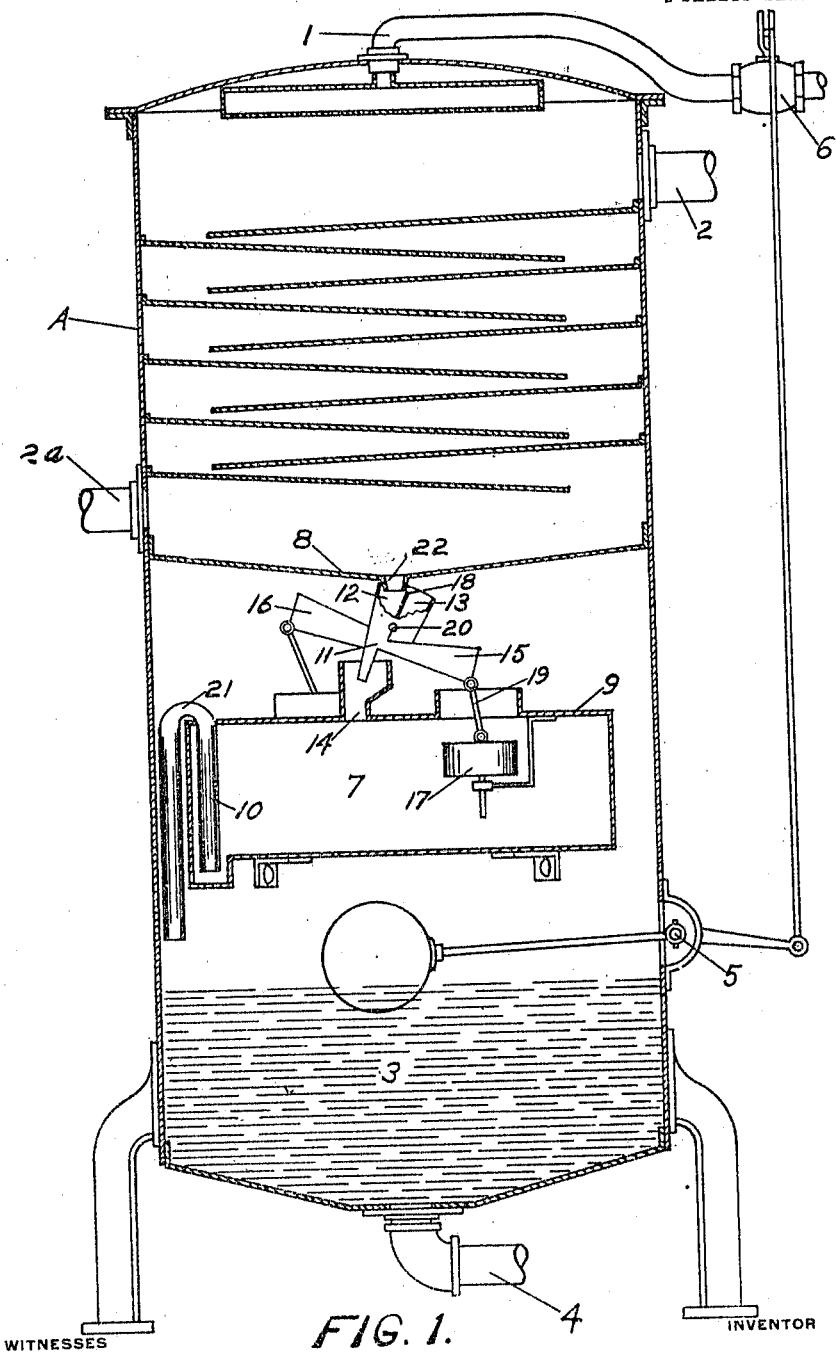

H. C. ALGER.
FEED WATER HEATER.
APPLICATION FILED AUG. 3, 1908.

990,028.

Patented Apr. 18, 1911.

2 SHEETS—SHEET 2.

WITNESSES
Floren V. Pedersen
Irvin Dischinger

INVENTOR
Harley C. Alger

UNITED STATES PATENT OFFICE.

HARLEY C. ALGER, OF CHICAGO HEIGHTS, ILLINOIS.

FEED-WATER HEATER.

990,028.

Specification of Letters Patent.

Patented Apr. 18, 1911.

Application filed August 3, 1908. Serial No. 446,622.

*To all whom it may concern:*

Be it known that I, HARLEY C. ALGER, a citizen of the United States, residing at Chicago Heights, in the county of Cook and State of Illinois, have invented a new and useful Feed-Water Heater, of which the following is a specification.

My invention relates to an improvement in feed water heaters.
In many plants where it is desired to measure the boiler feed water, as heretofore constructed, the water supply for the boilers is led to the heater where it is heated before being delivered to the boiler; the water is ordinarily admitted to the upper end of the heater and passes down through the heater to the bottom thereof, which constitutes a storage chamber. From thence it is delivered by gravity to a meter located generally on a lower plane and after passing through the meter, is delivered in unit charges to a storage chamber whence it is pumped to the boiler. This arrangement is subject to many disadvantages. In the first place, the delivery of the water from a higher to a lower plane, as when it passes from the heater to the meter and thence to the second storage chamber, decreases its head and throws more work on the pump which receives water from the second storage chamber and forces the water into the boiler. The greater the head of water supplied to a pump the less is the work necessary to be performed by the pump and hence the wear and tear on the pump is decreased. Furthermore in most plants it is necessary to maintain a certain head on the feed water pump to make the pump operate at all satisfactorily and it is very desirable to save every available amount of head. It required the expenditure of work to raise the water to the heater in the first place and loss of head without causing it to do work is wasted energy. In my invention a great portion of this head originally lost, is saved. Secondly, and more important still, the water in its passage to the meter and second storage tank under the old system loses, by radiation, a considerable portion of the heat imparted to it by the heater. Hence, a greater amount of heat must be developed in the boiler to evaporate the required amount of water than would be necessary if the water was delivered from the heater directly to the boiler. It has been found that the water after leaving the heater and passing through the meter and second storage tank cools about 20 degrees Fahrenheit.

In my invention the loss by radiation is hardly appreciable and the water will be delivered to the boiler at the same temperature at which it leaves the heater. This is most desirable because the water should be fed to the boiler as hot as possible.

The disadvantages heretofore mentioned are avoided by my invention which consists briefly in a heater and a meter combined in one device whereby the efficiency of the combination is greatly increased over the former arrangement wherein the heater and meter are separate elements.

Many plants are awake to the fact that it is desirable to weigh the feed water, whereby they can accurately determine the best fuel to use for evaporating the water, the efficiency of the engineer or fireman, and the efficiency of the boiler and grates. However, it is ofttimes not desirable, if not absolutely impracticable to install a meter in addition to the equipment already in place, both because of lack of room and because of the added expense, and of the loss entailed by the increased radiation and loss of head. Furthermore, in my invention, the meter storage tank is eliminated and floor space economized. Formerly the heater, and separate meter and storage tank therefor, occupied considerable room, whereas my invention occupies only the floor space originally covered by the heater alone, or less than half that heretofore required where a meter is used that delivers water in unit charges. The cost is reduced owing to the elimination of the meter storage tank and the provision of a meter within the heater. Thus it will be seen that in addition to avoiding the disadvantages of the prior system, my invention possesses merits of its own, all of which tend materially to the increase of boiler plant efficiency and the reduction of expense.

To these ends, therefore, my invention consists in certain novel features and combinations such as will be more fully described hereinafter and particularly pointed out in the claims.

Figure 2:
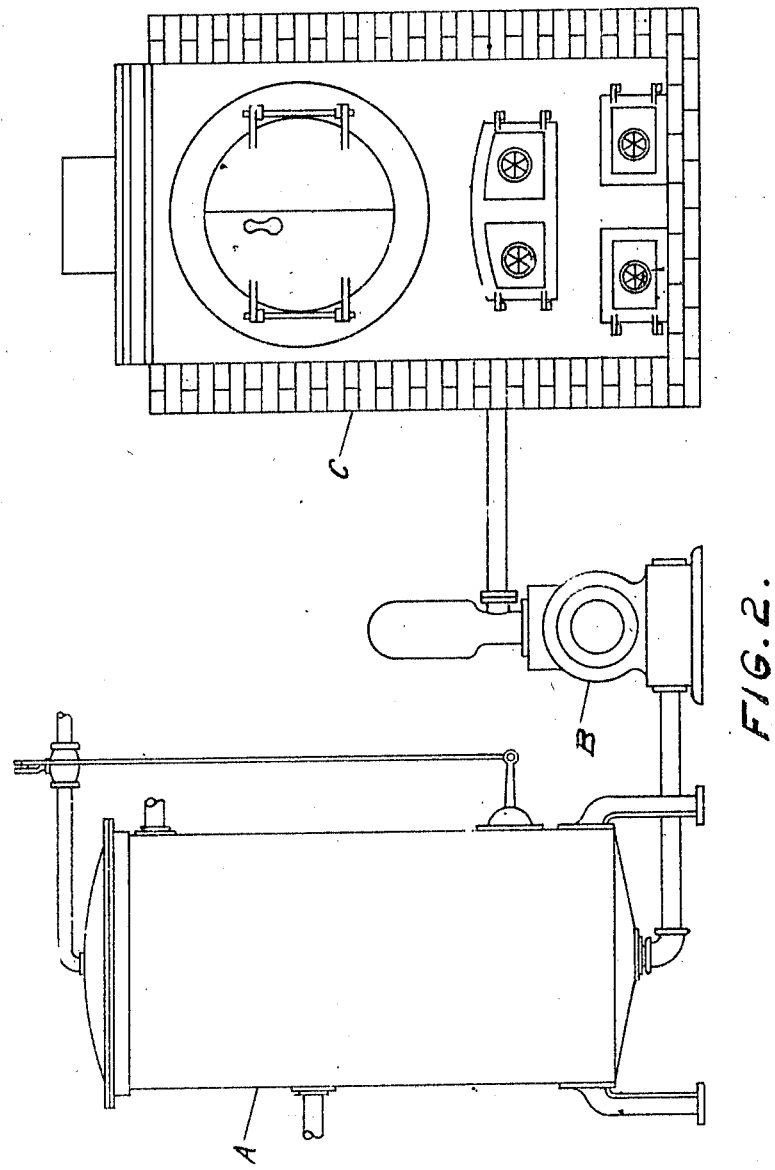

In the accompanying drawing, Figure 1 is a vertical sectional view through a heater constructed in accordance with my invention, and Fig. 2 is a diagrammatic view showing the assemblage of such a heater with a boiler.

A, indicates a heater of any approved type, that shown consisting of a suitably supported shell. A pipe 1 leads the feed water preferably to the upper end of the shell into which latter the water is discharged in any convenient manner. A steam pipe 2 conveys steam or other heating medium to the shell for the purpose of heating the water as it passes through the heater, the steam commingling with and raising the temperature of the water to say 208 degrees Fahrenheit or to say 230 degrees Fahrenheit if there is sufficient pressure in the heater. A pipe 2ª leads the steam from the heater. The water thus heated accumulates in the bottom of the shell which forms a reservoir or storage chamber 3. A pipe 4 leads from the storage chamber to a pump B which forces the water into the boiler C.

As usual, the heater is provided with a float and lever connection 5, the float being actuated by the height of water in the storage chamber 3 and controlling a valve 6 in the inlet pipe 1, to admit more or less water to the heater. My invention consists in the combination with such a heater, of a metering device 9 located above the storage chamber and within the heater, the meter adapted to catch and measure all the water delivered to the storage chamber and constituting an integral part of the heater.

I do not wish to confine myself to the use of any particular meter, but have shown one meter in Fig. 1, which is adapted to work within a heater and also under pressure. This particular meter has two measuring compartments only one of which is shown at 7. A siphon is adapted to drain each of the measuring compartments the siphon 10 being adapted to drain the measuring compartment 7. A tilting member 11, comprising two channels, 12 and 13, separated by the dividing partition, 18, directs the water to the measuring compartments, the channel 12, directing water to the measuring compartment 7, through the opening 14. The tilting member carries two receptacles 15 and 16, which communicate with the channels 12 and 13, respectively and is tilted by the rising of floats, one in either measuring compartment, the float 17, in measuring compartment 7, being the only one shown. This particular meter operates as follows:—Water enters the channel 12 through the aperture 22, in the diaphragm 8, and, after filling the receptacle 15, passes into the measuring compartment 7. When the measuring compartment 7, is nearly filled the float 17, will start to rise and when the measuring compartment is completely filled and water is about to spill over the top of the siphon 10, the float 17, lifts the receptacle 15, by means of the link 19 and tips the tilting member about its axis, 20. The water stored in the receptacle 15 is thus suddenly decanted into the measuring compartment 7, and suddenly spills over the top of the siphon 10, in sufficient quantity to start the siphon operating, which discharges the water from measuring compartment, 7. When the float 17, tips the tilting member 11, channel 13, is placed in communication with the aperture 22, and the water passes through channel 13 to the other measuring compartment, which is similar to measuring compartment 7, and a similar operation takes place. Any convenient form of register may be used to record each single unit charge or each double charge, and may be located exteriorly of the heater. In order to deliver the feed water to such internally located meter, I preferably provide a concave partition 8 apertured at its lowest point to deliver the hot feed water to the meter through which the water passes and is discharged into the storage chamber from whence it is pumped directly to the boiler.

It is evident that there will be a very great saving in heat if the water is measured within the heater and I do not intend to limit myself to the use of a siphon meter as described or to any particular form of meter.

From the foregoing it will be seen that I have materially increased the efficiency of the heater and thus of the entire system by reason of the reduction in radiation and loss of head and the economy in floor space. I have added to the compactness and reduced the expense of such an installation as is above described. The pressure of the steam will equalize on both sides of the diaphragm or partition 8 through the aperture therein, thereby permitting the operation of the meter and the delivery of water from the storage chamber under pressure. It will be observed that the water is measured after it is heated and before it is delivered from the heater. This makes it possible to convey the water from the heater directly to the boiler.

Having thus fully disclosed my invention, what I claim as new is:—

1. A heater comprising a shell, means for admitting water and steam thereto, a storage chamber formed in the shell, a discharge pipe therefrom and a meter located within the heater above the storage chamber.

2. The combination in a heater consisting of a shell having a storage chamber at its lower end, and means for admitting water and a heating medium thereto, of a meter within the shell to which the water when hot, is delivered, the meter adapted to measure the water and discharge it into the storage chamber.

3. A heater comprising a shell having a storage chamber, means for admitting water and a heating medium to the shell, an apertured diaphragm above the storage chamber and a meter located within the shell between the diaphragm and the storage chamber to receive the water collected by the diaphragm, measure it and deliver it to the storage chamber.

4. A water heating system comprising a heater, means for admitting water and steam thereto, the lower portion of the heater constituting a storage chamber for water, a measuring device, adapted to receive the water, measure it and deliver it to the storage chamber.

5. The combination with a water heater, of a water measuring compartment, located within the heater for measuring the water prior to its delivery from the heater.

6. A combined feed water heater and meter comprising a shell, an apertured partition dividing the shell into two compartments, means for leading the water to one of said compartments, means for heating the water in said compartment, a meter in the remaining compartment adapted to receive and measure all water passing through the aperture in the partition, and discharge it into the last named compartment, and means for conducting the water from said last named compartment.

7. The combination in a heater consisting of a shell having a storage chamber at its lower end and means for admitting water and heating medium to the shell, of a liquid measuring device adapted to receive the heated liquid, measure it and deliver it to the storage chamber.

8. A heater comprising a shell, means for admitting liquid and steam thereto, a storage chamber formed in the shell and means for measuring the water, such measuring means located within the storage chamber.

9. A heater comprising a shell, means for admitting water and steam thereto, a storage chamber in the shell, a discharge pipe therefrom and means for measuring the water, such measuring means to be located within the heater.

10. A heater comprising a shell, means for admitting water and heating medium thereto, a discharge therefrom and means for measuring the water, such measuring means located within the heater.

11. A heater comprising a shell, means for admitting water and heating medium thereto, a discharge therefrom, an apertured diaphragm for collecting the water, a measuring element adapted to receive liquid from the diaphragm and measure it, prior to its delivery from the shell.

12. The combination of a heater comprising a shell, means for admitting liquid and heating medium thereto, a discharge therefrom, means for collecting the liquid within the shell and a measuring device, adapted to receive the liquid from the collecting means and measure it before it is delivered from the shell.

13. The combination of a liquid heater and a measuring device, the heater comprising a shell, means dividing the shell to form a storage chamber in its lower portion, with a heating chamber above the storage chamber, means for admitting liquid and heating medium to the heating chamber, the measuring device adapted to receive liquid from the heating chamber and deliver it to the storage chamber.

14. A feed water system for boilers comprising a heater having a shell with a storage chamber at its lower end, means for admitting water and heating medium to the shell, a measuring device within the shell to which the water is delivered, the measuring device adapted to measure the water and deliver it to the storage chamber, means for withdrawing the water from the storage chamber and for delivering it to the boiler.

15. A heater comprising a shell, means for admitting liquid and heating medium thereto, a discharge therefrom, a measuring element adapted to receive liquid from the heater, such measuring element located within the shell and a registering device for recording the amount of water supplied to or delivered from the measuring element.

In testimony whereof, I have signed my name to this specification in the presence of two subscribing witnesses.

HARLEY C. ALGER.

In the presence of—
EMMA ALGER,
ORLANDO H. ALGER.